(12) United States Patent
Chiba et al.

(10) Patent No.: US 7,895,831 B2
(45) Date of Patent: Mar. 1, 2011

(54) EXHAUST EMISSION CONTROL SYSTEM AND METHOD FOR INTERNAL COMBUSTION ENGINE AND ENGINE CONTROL UNIT

(75) Inventors: Isao Chiba, Saitama-ken (JP); Yoshinori Ishihara, Saitama-ken (JP); Kouji Okayasu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 879 days.

(21) Appl. No.: 11/882,658

(22) Filed: Aug. 3, 2007

(65) Prior Publication Data
US 2008/0029064 A1 Feb. 7, 2008

(30) Foreign Application Priority Data
Aug. 7, 2006 (JP) .............................. 2006-215032

(51) Int. Cl.
| | |
|---|---|
| F02B 27/04 | (2006.01) |
| F01N 3/00 | (2006.01) |
| B01D 46/00 | (2006.01) |
| B60T 7/12 | (2006.01) |
| G05D 1/00 | (2006.01) |
| G06F 7/00 | (2006.01) |
| G06F 17/00 | (2006.01) |
| G06F 19/00 | (2006.01) |
| G06G 7/70 | (2006.01) |
| G06G 7/76 | (2006.01) |
| G08G 1/00 | (2006.01) |

(52) U.S. Cl. ............... 60/295; 60/273; 60/285; 60/297; 95/278; 95/283; 701/103; 701/104; 701/105; 701/117; 701/118; 701/119

(58) Field of Classification Search .......... 60/273, 60/285, 286, 295, 297; 95/278, 279, 283; 701/101–105, 114, 115, 117–119; 123/27 R
See application file for complete search history.

(56) References Cited

U.S. PATENT DOCUMENTS

2005/0056005 A1* 3/2005 Otake et al. .................. 60/295

(Continued)

FOREIGN PATENT DOCUMENTS

EP    0 927 818 A1    7/1999

(Continued)

OTHER PUBLICATIONS

C.I. Kwon, English Abstract of KR 514,862 B, Sep. 14, 2005.*

(Continued)

Primary Examiner—Thomas E Denion
Assistant Examiner—Audrey Klasterka
(74) Attorney, Agent, or Firm—Arent Fox LLP

(57) ABSTRACT

An exhaust emission control system for an internal combustion engine with a filter provided in the exhaust system of the engine, for collecting particulates from exhaust gases. An ECU carries out the post injection for additionally injecting fuel into a combustion chamber of the engine after a combustion stroke of the engine to thereby perform a regeneration operation for regenerating the filter. A vehicle speed sensor detects a travel distance of a vehicle on which the engine is installed, and the ECU calculates a post injection allowable amount such that the post injection allowable amount increases in accordance with increase in the detected travel distance. During execution of the post injection, the amount of fuel injected through the post injection is subtracted from the post injection allowable amount, and when the post injection allowable amount becomes equal to or smaller than a predetermined first threshold value, the post injection is inhibited.

12 Claims, 5 Drawing Sheets

U.S. PATENT DOCUMENTS

2005/0223700 A1* 10/2005 Abe .............................. 60/295
2005/0223701 A1* 10/2005 Sato et al. ...................... 60/295

FOREIGN PATENT DOCUMENTS

| | | |
|---|---|---|
| EP | 1 380 742 A1 | 1/2004 |
| EP | 1 584 802 A2 | 10/2005 |
| JP | 2003-322044 | 11/2003 |
| JP | 2004-36454 | 2/2004 |
| JP | 2005-299456 A | 10/2005 |
| JP | 2006-183563 A | 7/2006 |

OTHER PUBLICATIONS

C.I. Kwon, English Abstract of KR 506,716 B, Aug. 5, 2005.*

* cited by examiner

F I G. 4
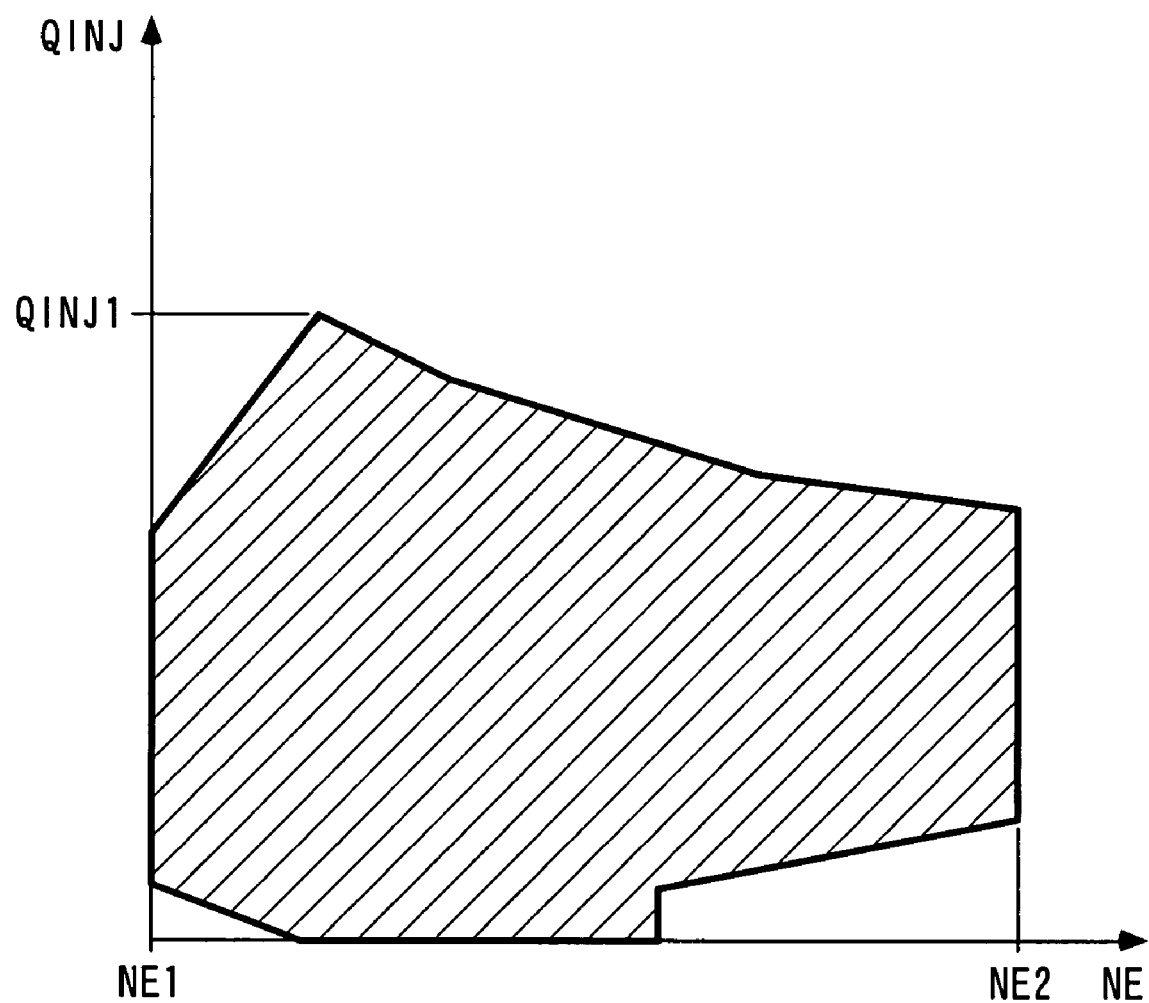

EXHAUST EMISSION CONTROL SYSTEM AND METHOD FOR INTERNAL COMBUSTION ENGINE AND ENGINE CONTROL UNIT

BACKGROUND OF THE INVENTION

1. Field of the Invention

The present invention relates to an exhaust emission control system and method for an internal combustion engine and an engine control unit, for reducing exhaust emissions by collecting particulates from exhaust gases discharged from an internal combustion engine, particularly from a diesel engine, installed on a means of transportation, as a drive source.

2. Description of the Related Art

In general, in a diesel engine (hereinafter referred to as "the engine") which uses an exhaust emission control system of the above-mentioned type, as the amount of particulate matter deposited on a filter increases, exhaust pressure rises, which results in a lowered engine output and decreased fuel economy. To avoid the above inconveniences, a regeneration operation for regenerating the filter is carried out. This regeneration operation is performed by carrying out post injection for injecting fuel into a combustion chamber after a combustion stroke in addition to fuel required for combustion of the engine. The post injection causes exhaust gases to contain unburned fuel, and the unburned fuel is burned upstream of the filter in an exhaust pipe to raise the temperature of the filter. As a consequence, the particulate matter deposited on the filter is burned, whereby the filter is regenerated.

During the filter regeneration operation, part of the post-injected fuel is deposited on the wall surface and the like part of the combustion chamber and mixed into engine lubricating oil without being discharged from the combustion chamber, which causes oil dilution. If the oil dilution becomes excessive, the engine lubricating oil cannot fully exert the effects of its lubricating function, so that it is impossible to maintain a normal operation of the engine. To solve this problem, a control system for an internal combustion engine, for suppressing oil dilution has been proposed e.g. in Japanese Laid-Open Patent Publication (Kokai) No. 2003-322044.

This control system is for a gasoline engine. In the control system, at the start of the engine, fuel injection timing is set according to the count value of a dilution counter. The count value is calculated as follows: First, a coolant temperature at the start of the engine is stored, and during operation of the engine, the integral value of the amount of intake air is calculated. Then, if the coolant temperature and the integral value of the amount of intake air are not larger than respective predetermined values when the engine stops, the counter value is incremented. This process is executed whenever the engine is operated. Then, when the counter value exceeds a predetermined value, it is judged that excessive oil dilution may have occurred, and at the start of the engine, the fuel injection timing is set to a further advanced value so as to suppress the oil dilution.

However, in a case where the conventional control system is applied to a diesel engine having the aforementioned filter, if post injection timing is set to an advanced value so as to suppress oil dilution, the supplied fuel becomes easy to burn in the combustion chamber, and hence unburned fuel required for filter regeneration cannot be supplied to the exhaust system of the engine, which makes it difficult to fully regenerate the filter. Further, the output torque increases for the same reason. On the other hand, if the post injection is set to such timing as will enable filter regeneration, part of fuel remains in the combustion chamber, which prevents reliable suppression of oil dilution.

SUMMARY OF THE INVENTION

It is an object of the invention to provide an exhaust emission control system and method for an internal combustion engine and an engine control unit, which are capable of not only reliably suppressing post injection for regenerating a filter from causing oil dilution, but also enabling execution of the post injection to a maximum extent.

To attain the above object, in a first aspect of the present invention, there is provided an exhaust emission control system for an internal combustion engine, for reducing exhaust emissions by collecting particulates from exhaust gases discharged from the engine, which is installed on a means of transportation as a drive source, into an exhaust system, comprising a filter provided in the exhaust system, for collecting the particulates from the exhaust gases, regeneration operation-executing means for carrying out post injection for additionally injecting fuel into a combustion chamber of the engine after a combustion stroke of the engine to thereby perform a regeneration operation for regenerating the filter, travel distance-detecting means for detecting a travel distance of the means of transportation, post injection allowable amount-calculating means for calculating a post injection allowable amount indicative of an allowable amount of fuel to be injected by the post injection such that the post injection allowable amount increases in accordance with an increase in the detected travel distance, post injection allowable amount-reducing means for subtracting an amount of fuel injected by the post injection from the post injection allowable amount during execution of the post injection, and post injection-inhibiting means for inhibiting the post injection when the post injection allowable amount is not larger than a predetermined first threshold value.

With the configuration of the exhaust emission control system according to the present invention, particulates contained in exhaust gases discharged from the engine installed on the means of transportation are collected by the filter provided in the exhaust system. The regeneration operation-executing means carries out the post injection after the combustion stroke of the engine to thereby perform the filter regeneration operation. As a consequence, unburned fuel supplied to the exhaust system is burned on the filter or upstream of the filter to raise the temperature of the filter, whereby particulate matter deposited on the filter is burned to regenerate the filter. The post injection allowable amount-calculating means calculates the post injection allowable amount such that the post injection allowable amount increases in accordance with an increase in the detected travel distance of the means of transportation, and the post injection allowable amount-reducing means subtracts the amount of fuel injected by the post injection from the post injection allowable amount during execution of the post injection. Further, the post injection-inhibiting means inhibits the post injection when the post injection allowable amount is not larger than the predetermined first threshold value.

When the post injection is executed, part of fuel is mixed into lubricating oil to increase the level of oil dilution. On the other hand, when the engine is operated, fuel mixed into the lubricating oil by the post injection progressively evaporates. As the travel distance of the means of transportation is longer, the amount of evaporated fuel becomes larger, and accordingly, the oil dilution level becomes lower. According to the first aspect of the present invention, the post injection allowable amount is calculated such that it increases in accordance with an increase in the travel distance. Consequently, the calculated post injection allowable amount indicates that as the value thereof is larger, the oil dilution level is lower. In short, the post injection allowable amount represents an allowable amount of fuel to be injected by the post injection, without causing excessive dilution.

Therefore, using the post injection allowable amount as a parameter, by inhibiting the post injection when a value obtained by subtracting the amount of post-injected fuel from the post injection allowable amount becomes equal to or smaller than the first threshold value, it is possible to reliably suppress oil dilution so as to prevent occurrence of excessive oil dilution. Further, since the post injection is permitted insofar as the post injection allowable amount is larger than the first threshold value, it is possible to execute the post injection to the maximum possible extent.

Preferably, the exhaust emission control system further comprises post injection inhibition-canceling means for canceling the inhibition of the post injection when the post injection allowable amount becomes not smaller than a predetermined second threshold value larger than the first threshold value, during the inhibition of the post injection.

With the configuration of this preferred embodiment, when the engine is operated in a state where the post injection is inhibited, the evaporation of fuel proceeds in accordance with an increase in the travel distance of the means of transportation, whereby oil dilution is reduced, and the post injection allowable amount is calculated such that it increases in accordance with the increase in the travel distance. Therefore, by canceling inhibition of the post injection when the post injection allowable amount becomes equal to or larger than the second threshold value after inhibiting the post injection, it is possible to restart the post injection in appropriate timing in which oil dilution is positively reduced.

Preferably, the exhaust emission control system further comprises regeneration completion-determining means for determining whether or not regeneration of the filter by the regeneration operation has been completed, and post injection allowable amount-resetting means for resetting the post injection allowable amount when it is determined that the regeneration of the filter by the regeneration operation has been completed.

With the configuration of this preferred embodiment, by resetting the post injection allowable amount when filter regeneration is completed, it is possible to properly perform calculation of the post injection allowable amount after completion of the filter regeneration, and properly execute inhibition of the post injection and cancellation of the inhibition based on the calculated value of the post injection allowable amount.

To attain the above object, in a second aspect of the present invention, there is provided a method of reducing exhaust emissions from an internal combustion engine by collecting particulates from exhaust gases discharged from the engine, which is installed on a means of transportation as a drive source, into an exhaust system provided with a filter for collecting the particulates from the exhaust gases, comprising a regeneration operation-executing step of carrying out post injection for additionally injecting fuel into a combustion chamber of the engine after a combustion stroke of the engine to thereby perform a regeneration operation for regenerating the filter, a travel distance-detecting step of detecting a travel distance of the means of transportation, a post injection allowable amount-calculating step of calculating a post injection allowable amount indicative of an allowable amount of fuel to be injected by the post injection such that the post injection allowable amount increases in accordance with an increase in the detected travel distance, a post injection allowable amount-reducing step of subtracting an amount of fuel injected by the post injection from the post injection allowable amount during execution of the post injection, and a post injection-inhibiting step of inhibiting the post injection when the post injection allowable amount is not larger than a predetermined first threshold value.

With the configuration of the second aspect of the present invention, it is possible to obtain the same advantageous effects as provided by the first aspect of the present invention.

Preferably, the method further comprises a post injection inhibition-canceling step of canceling the inhibition of the post injection when the post injection allowable amount becomes not smaller than a predetermined second threshold value larger than the first threshold value, during the inhibition of the post injection.

Preferably, the method further comprises a regeneration completion-determining step of determining whether or not regeneration of the filter by the regeneration operation has been completed, and a post injection allowable amount-resetting step of resetting the post injection allowable amount when it is determined that the regeneration of the filter by the regeneration operation has been completed.

With the configurations of these preferred embodiments, it is possible to obtain the same advantageous effects as provided by the corresponding preferred embodiments of the first aspect of the present invention.

To attain the above object, in a third aspect of the present invention, there is provided an engine control unit including a control program for causing a computer to execute a method of reducing exhaust emissions from an internal combustion engine by collecting particulates from exhaust gases discharged from the engine, which is installed on a means of transportation as a drive source, into an exhaust system provided with a filter for collecting the particulates from the exhaust gases, wherein the control program causes the computer to carry out post injection for additionally injecting fuel into a combustion chamber of the engine after a combustion stroke of the engine to thereby perform a regeneration operation for regenerating the filter, detect a travel distance of the means of transportation, calculate a post injection allowable amount indicative of an allowable amount of fuel to be injected by the post injection such that the post injection allowable amount increases in accordance with an increase in the detected travel distance, subtract an amount of fuel injected by the post injection from the post injection allowable amount during execution of the post injection, and inhibit the post injection when the post injection allowable amount is not larger than a predetermined first threshold value.

With the configuration of the third aspect of the present invention, it is possible to obtain the same advantageous effects as provided by the first aspect of the present invention.

Preferably, the control program causes the computer to cancel the inhibition of the post injection when the post injection allowable amount becomes not smaller than a predetermined second threshold value larger than the first threshold value, during the inhibition of the post injection.

Preferably, the control program causes the computer to determine whether or not regeneration of the filter by the regeneration operation has been completed, and reset the post injection allowable amount when it is determined that the regeneration of the filter by the regeneration operation has been completed.

With the configurations of these preferred embodiments, it is possible to obtain the same advantageous effects as provided by the corresponding preferred embodiments of the first aspect of the present invention.

The above and other objects, features, and advantages of the invention will become more apparent from the following detailed description taken in conjunction with the accompanying drawings.

BRIEF DESCRIPTION OF THE DRAWINGS

FIG. 4 is a diagram useful in explaining a predetermined operating condition that permits execution of a regeneration operation.

DETAILED DESCRIPTION OF THE PREFERRED EMBODIMENTS

The invention will now be described in detail with reference to the drawings showing a preferred embodiment thereof.

Figure 1:
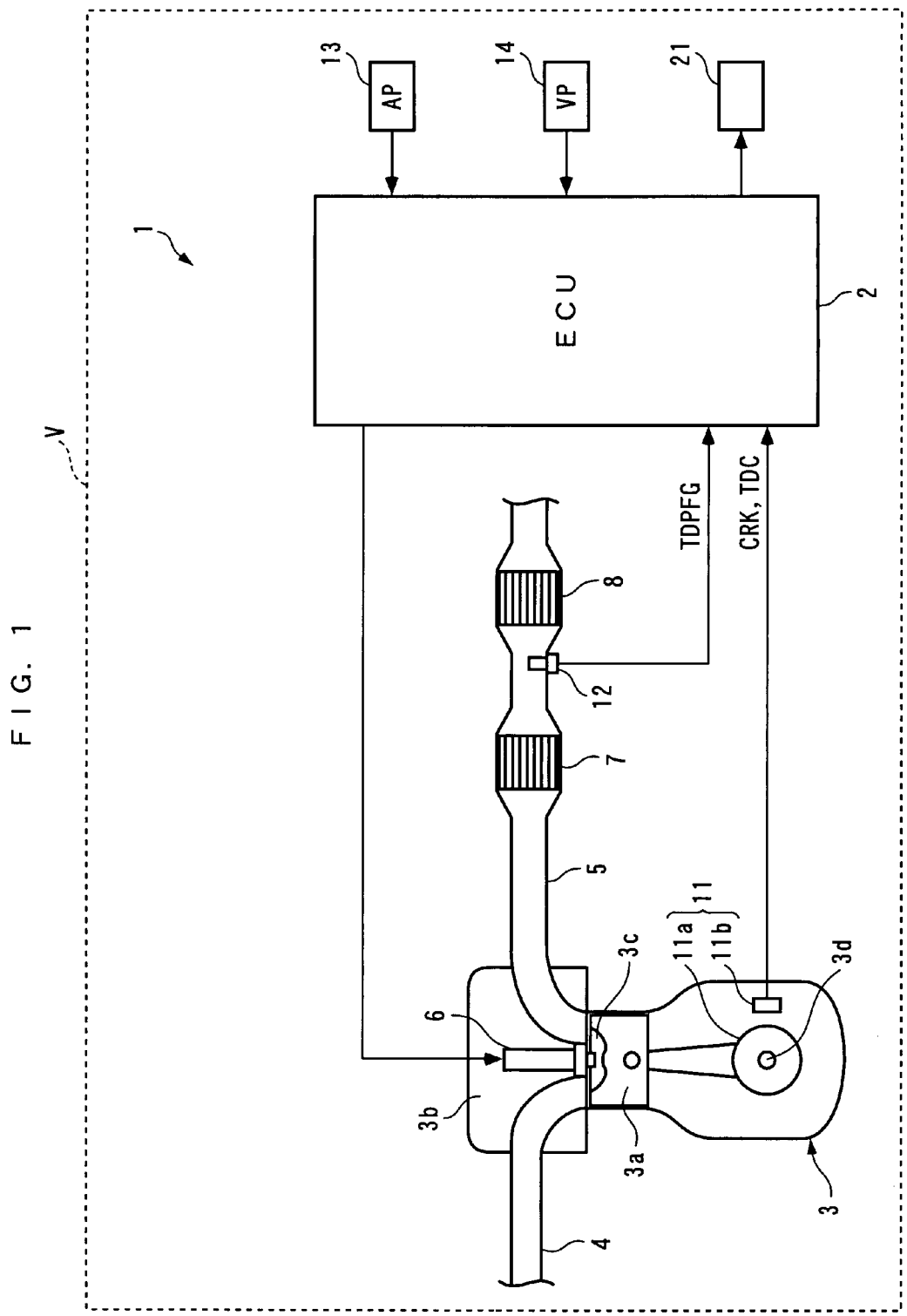
FIG. 1 is a schematic view of an exhaust emission control system according to the present invention and an internal combustion engine to which is applied the exhaust emission control system.

Referring to FIG. 1, there are schematically shown an exhaust emission control system 1 according to the present invention, and an internal combustion engine (hereinafter referred to as "the engine") 3 to which is applied the exhaust emission control system. The engine 3 is e.g. a four-cylinder type diesel engine which is mounted on a vehicle V (transport) as a drive source.

The engine 3 has a combustion chamber 3c defined between a piston 3a and a cylinder head 3b. An intake pipe 4 and an exhaust pipe 5 (exhaust system) are connected to the cylinder head 3b, and a fuel injection valve (hereinafter referred to as "the injector") 6 is mounted through the cylinder head 3b in a manner facing the combustion chamber 3c.

The injector 6 is disposed in the central part of the top wall of the combustion chamber 3c, and is connected to a high-pressure pump (not shown) and a fuel tank (not shown) in the mentioned order via a common rail (not shown). Fuel in the fuel tank is pressurized by the high-pressure pump, and then sent to the injector 6 via the common rail to be injected from the injector 6 into the combustion chamber 3c. A fuel injection amount QINJ and injection timing of the injector 6 are controlled by an ECU 2, described hereinafter.

Further, a magnet rotor 11a is mounted on a crankshaft 3d of the engine 3. The magnet rotor 11a and an MRE pickup 11b form a crank angle sensor 11. The crank angle sensor 11 delivers a CRK signal and a TDC signal, which are both pulse signals, to the ECU 2 in accordance with rotation of the crankshaft 3d.

Each pulse of the CRK signal is generated whenever the crankshaft 3d rotates through a predetermined angle (e.g. 1°). The ECU 2 determines the rotational speed NE of the engine 3 (hereinafter referred to as "the engine speed NE") based on the CRK signal. The TDC signal is indicative of the piston 3a of each cylinder being at a predetermined crank angle position in the vicinity of the top dead center (TDC) at the start of the intake stroke of the piston, and in the case of the four-cylinder engine of the present example, it is delivered whenever the crankshaft 3d rotates through 180°.

A catalytic converter 7 and a filter 8 are inserted into an exhaust pipe 5 at respective locations in this order from upstream side. The catalytic converter 7 is comprised of an oxidation catalyst (not shown) and an NOx catalyst (not shown). The oxidation catalyst oxidizes HC and CO in exhaust gases, and the NOx catalyst adsorbs NOx in the exhaust gases and reduces the adsorbed NOx, whereby exhaust emissions are reduced.

The filter 8 has a honeycomb core (not shown) formed e.g. of a porous ceramic, and is configured such that it collects particulate matter (hereinafter referred to as "PM"), such as soot, from exhaust gases to thereby reduce the amount of PM emitted into the air. Further, the honeycomb core of the filter 8 supports the same oxidation catalyst (not shown) as the oxidation catalyst of the catalytic converter 7. As described above, since the filter 8 supports the oxidation catalyst, the temperature of the filter 8 is raised by the oxidation reaction of the oxidation catalyst, whereby PM is burned.

Further, an exhaust gas temperature sensor 12 is inserted into the exhaust pipe 5 at a location immediately upstream of the filter 8. The exhaust gas temperature sensor 12 detects a temperature TDPFG of exhaust gases immediately upstream of the filter 8 (hereinafter referred to as "the pre-filter gas temperature TDPFG"), and delivers a signal indicative of the sensed pre-filter gas temperature TDPFG to the ECU 2.

Furthermore, an accelerator pedal opening sensor 13 detects the degree of opening or stepped-on amount AP of an accelerator pedal, not shown, of a vehicle V (hereinafter referred to as "the accelerator pedal opening AP"), and delivers a signal indicative of the sensed accelerator pedal opening AP to the ECU 2, and a vehicle speed sensor 14 (travel distance-detecting means) detects a traveling speed of the vehicle V (hereinafter referred to as "the vehicle speed VP"), and delivers a signal indicative of the sensed vehicle speed VP to the ECU 2. The ECU 2 also has a DPF lamp 21 connected thereto.

The ECU 2 is implemented by a microcomputer comprised of an I/O interface, a CPU, a RAM, and a ROM. The detection signals from the aforementioned sensors 11 to 14 are input to the CPU after the I/O interface performs A/D conversion and waveform shaping thereon.

In response to these input signals, the CPU executes a regeneration control process for controlling a regeneration operation for regenerating the filter 8 in accordance with control programs read from the ROM. In this process, the filter regeneration operation is performed through post injection for additionally injecting fuel into the combustion chamber 3c during the expansion stroke and/or the exhaust stroke of each cylinder. The amount QPOST of fuel to be injected through the post injection (hereinafter referred to as "the post injection amount POSTQ") is controlled based on the pre-filter gas temperature TDPFG such that the temperature of the filter 8 becomes equal to a target temperature (e.g. 600° C.). Thus, the filter 8 is controlled to be in a high-temperature condition so as to burn PM deposited thereon, whereby the filter 8 is regenerated.

In the present embodiment, the ECU 2 corresponds to the regeneration operation-executing means, the travel distance-detecting means, post injection allowable amount-calculating means, post injection allowable amount-reducing means, post injection-inhibiting means, post injection inhibition-canceling means, regeneration completion-determining means, and post injection allowable amount-resetting means.

Figure 2:
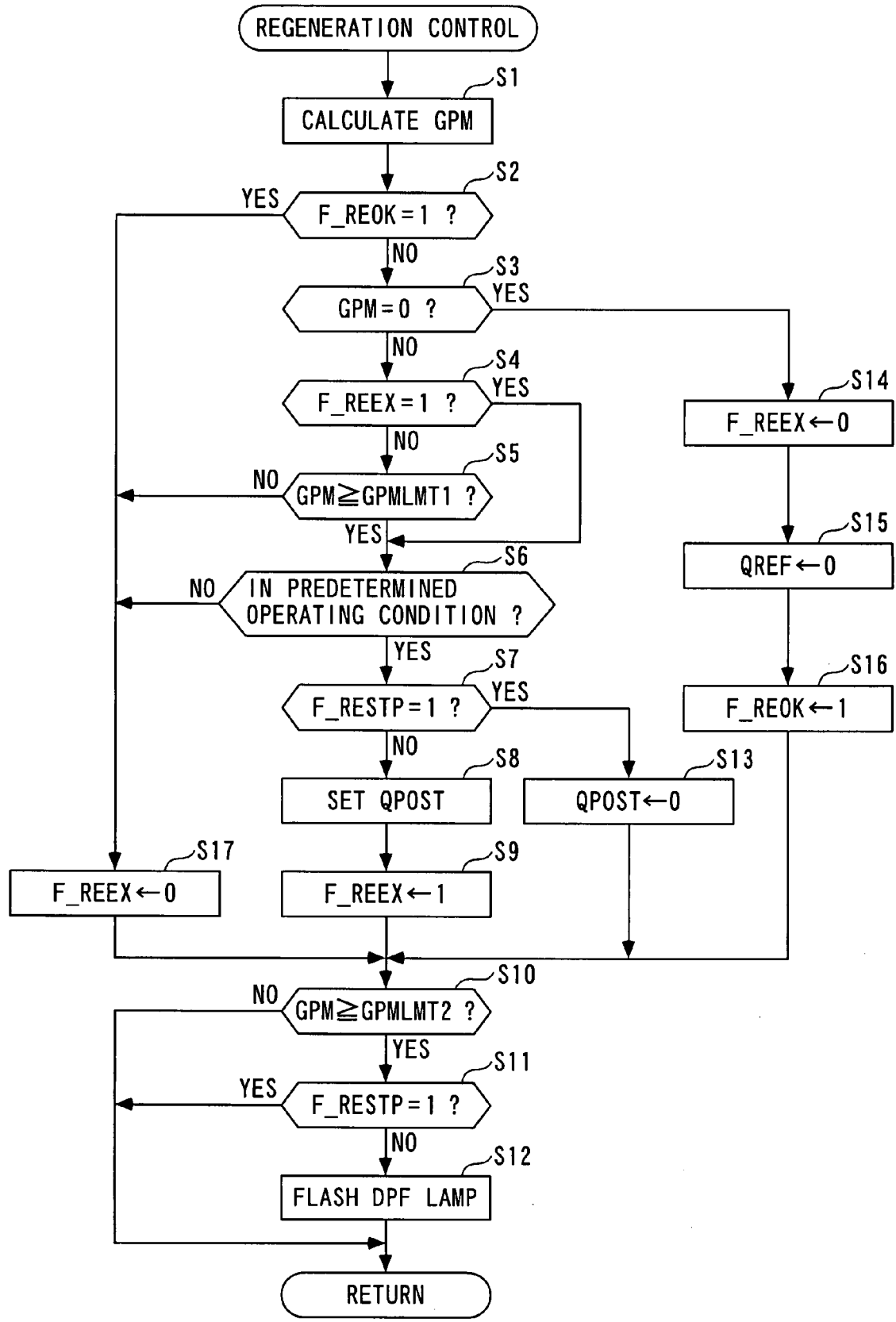
FIG. 2 is a flowchart of a filter regeneration control process.

FIG. 2 is a flowchart of the filter regeneration control process. The present process is carried out in synchronism with generation of each pulse of the TDC signal. In the present process, first, in a step 1 (shown as S1 in abbreviated form in FIG. 2, and the following steps are also shown in abbreviated form), the amount GPM of PM deposited on the filter 8 (hereinafter referred to as "the PM deposition amount GPM") is calculated. Specifically, the amount of PM discharged from the engine 3 is calculated by searching a map (not shown) according to the engine speed NE and the fuel injection amount QINJ. The fuel injection amount QINJ is calculated by searching a map (not shown) according to the engine speed NE and the accelerator pedal opening AP. Next, the amount of PM burned in the filter 8 is calculated by searching a table (not shown) according to the pre-filter gas temperature TDPFG. Then, a PM deposition amount per TDC event is calculated by subtracting the amount of burned PM from the calculated amount of discharged PM, and the calculated PM deposition amount per TDC event is added to the immediately preceding value of the PM deposition amount GPM to thereby calculate the current value of the PM deposition amount GPM.

During execution of the filter regeneration operation, as the amount of burned PM sharply increases to exceed the amount of discharged PM, the PM deposition amount GPM progressively decreases. It should be noted that the PM deposition amount GPM is subjected to a limiting process so as to prevent the PM deposition amount GPM from becoming smaller than a value of 0.

Next, it is determined whether or not a regeneration completion flag F_REOK is equal to 1 (step 2). If the answer to the question is negative (NO), it is determined whether or not the PM deposition amount GPM is equal to 0 (step 3). If the answer to the question is negative (NO), it is determined whether or not a regeneration execution flag F_REEX is equal to 1 (step 4). If the answer to the question is negative (NO), it is determined whether or not the PM deposition amount GPM is not smaller than a predetermined first threshold value GPMLMT1 (step 5).

If the answer to the question is negative (NO), i.e. if GPM<GPMLMT1 holds, it is judged that the PM deposition amount GPM is relatively small and therefore the filter regeneration operation is not to be executed, and the regeneration execution flag F_REEX is set to 0 (step 17). Then, it is determined whether or not the PM deposition amount GPM is not smaller than a predetermined second threshold value GPMLMT2 which is larger than the first threshold value GPMLMT1 (step 10). If the answer to the question of the step 5 is negative (NO), the answer to the question of the step 10 is also negative (NO). In this case, the present process is immediately terminated.

On the other hand, if the answer to the question of the step 5 is affirmative (YES), i.e. if GPM≧GPMLMT1 holds, it is judged that the PM deposition amount GPM is relatively large, and the process proceeds to a step 6, wherein it is determined whether or not the engine 3 is in a predetermined operating condition. The predetermined operating condition corresponds to a state where the engine speed NE and the fuel injection amount QINJ are within a hatched area shown in FIG. 4 (e.g. in a low-load operating region). Predetermined engine speeds NE1 and NE2 in FIG. 4 are set to e.g. 1000 rpm and 4000 rpm, respectively, and a predetermined fuel injection amount QINJ1 is set to approximately 70% of a fuel injection amount in full-load operation, for example.

If the answer to the question of the step 6 is negative (NO), it is judged that the engine 3 is not in the predetermined operating condition suitable for regeneration operation, and the step 17 is executed, followed by the process proceeding to the step 10. In this case, it is sometimes determined in the step S10 that the PM deposition amount GPM is not smaller than the second threshold value GPMLMT2, i.e. if the answer to the question of the step 10 can be affirmative (YES), and if so, it is determined whether or not a regeneration-inhibiting flag F_RESTP is equal to 1 (step 11). This regeneration-inhibiting flag F_RESTP is set to 1 when it is determined, during a filter regeneration operation in a process described in detail hereinafter with reference to FIG. 3, that the regeneration operation is to be inhibited.

If the answer to the question of the step 11 is negative (NO), the DPF lamp 21 is flashed (step 12), followed by terminating the present process. The DPF lamp 21 is thus flashed for the purpose of notifying the driver of an extreme increase in the PM deposition amount GPM, and recommending him/her to drive the vehicle V in a suburb, for example, so as to enable the filter regeneration operation.

On the other hand, if the answer to the question of the step 11 is affirmative (YES), i.e. if the regeneration-inhibiting flag F_RESTP is equal to 1, the present process is immediately terminated without flashing the DPF lamp 21. When the regeneration-inhibiting flag F_RESTP is equal to 1, the filter regeneration is inhibited regardless of the PM deposition amount GPM. Therefore, flashing of the DPF lamp 21 is disabled so as to prevent the driver from taking an unnecessary action for filter regeneration.

If the answer to the question of the step 6 is affirmative (YES), i.e. if the PM deposition amount GPM is relatively large, which means that the engine 3 is in the predetermined operating condition suitable for regeneration operation, it is determined whether or not the regeneration-inhibiting flag F_RESTP is equal to 1 (step 7).

If the answer to the question is negative (NO), a post injection amount QPOST is set (step 8) so as to carry out the filter regeneration operation, and the regeneration execution flag F_REEX is set to 1 (step 9). As a consequence, the filter regeneration operation is executed, whereby the filter 8 is regenerated. Then, the process proceeds to the steps 10 et seq. Further, the execution of the step 9 makes the answer to the question of the step 4 affirmative (YES), and therefore the process skips over the step 5 to the step 6.

On the other hand, if the answer to the question of the step 7 is affirmative (YES), i.e. if the regeneration-inhibiting flag F_RESTP has become equal to 1, the post injection amount QPOST is set to 0 (step 13) to thereby inhibit the post injection, followed by the process proceeding to the steps 10 et seq.

If the answer to the question of the step 3 is affirmative (YES), i.e. if the PM deposition amount GPM has become equal to 0, it is judged that the filter regeneration operation is to be stopped, and the regeneration execution flag F_REEX is set to 0 (step 14). Further, a post injection allowable amount QREF, referred to hereinafter, is reset to 0 (step 15), and then the regeneration completion flag F_REOK is set to 1 (step 16) so as to indicate that the regeneration of the filter 8 has been completed, followed by the process proceeding to the steps 10 et seq.

As described above, the filter regeneration operation is started when the PM deposition amount GPM becomes equal to or larger than the first threshold value GPMLMT1 and the engine 3 is in the predetermined operating condition, and is terminated when the regeneration-inhibiting flag F_RESTP is set to 1 or when the PM deposition amount GPM becomes equal to 0 which means that the regeneration of the filter 8 is completed.

Figure 3:
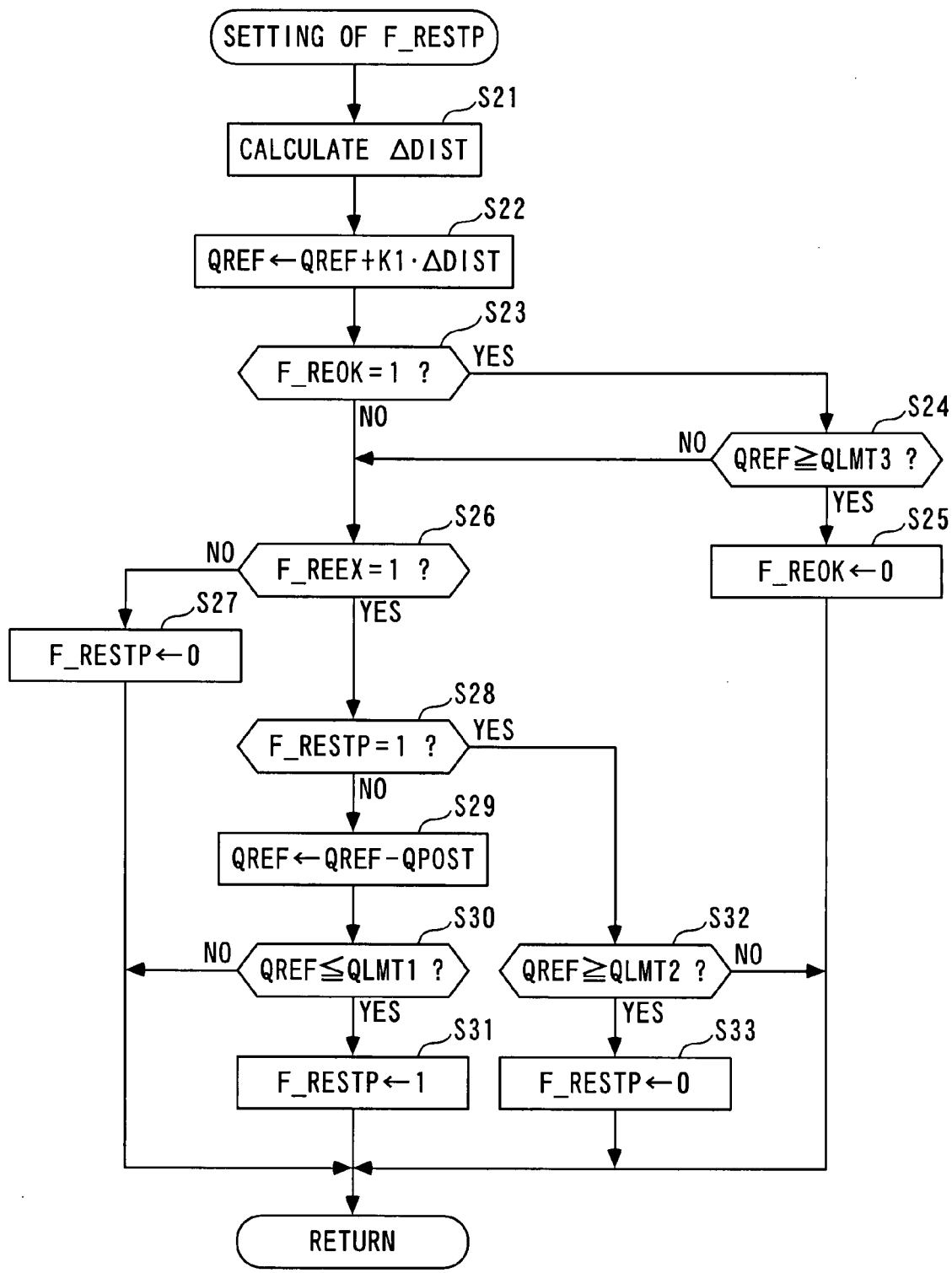
FIG. 3 is a flowchart of a process for setting a regeneration-inhibiting flag which is used in the process in FIG. 2.

FIG. 3 is a flowchart of a process for setting the regeneration-inhibiting flag F_RESTP which is used in the process in FIG. 2. Similarly to the process in FIG. 2, the present process is carried out in synchronism with generation of each pulse of the TDC signal. First, in a step 21, a travel distance ΔDIST of the vehicle V per TDC event (hereinafter referred to as "the TDC distance") is calculated. This TDC distance ΔDIST is calculated e.g. based on the vehicle speed VP.

Next, the calculated TDC distance ΔDIST is multiplied by a predetermined coefficient K1, and a value obtained by the multiplication is added to the immediately preceding value of the post injection allowable amount QREF (=QREF+ K1·ΔDIST), whereby the current value of the post injection allowable amount QREF is obtained (step 22). As described hereinbefore, during operation of the engine 3, fuel mixed into lubricating oil by post injection progressively evaporates, and as the travel distance of the vehicle V is longer, the amount of evaporated fuel becomes larger, which reduces an oil dilution level. The value K1·ΔDIST obtained by multiplying the TDC distance ΔDIST by the coefficient K1 corresponds to the amount of evaporated fuel per TDC event. Further, the post injection allowable amount QREF calculated by integrating the value K1·ΔDIST represents an allowable amount of fuel to be injected by post injection, without causing excessive oil dilution.

Then, it is determined whether or not the regeneration completion flag F_REOK is equal to 1 (step 23). Immediately after completion of regeneration of the filter 8, the regeneration completion flag F_REOK is set to 1, and therefore the answer to the question of the step 23 is affirmative (YES). In this case, it is determined whether or not the post injection allowable amount QREF is not smaller than a predetermined third threshold value QLMT3 (step 24). Immediately after completion of regeneration of the filter 8, the post injection allowable amount QREF is reset to 0, and therefore the answer to the question of the step 24 is negative (NO). In this case, the process proceeds to steps 26 et seq.

On the other hand, when the post injection allowable amount QREF increases as the vehicle V goes on traveling after completion of regeneration of the filter 8, and becomes equal to or larger than the third threshold value QLMT3, the answer to the question of the step 24 becomes affirmative (YES). In this case, the regeneration completion flag F_REOK is set to 0 (step 25), followed by terminating the present process. As described hereinbefore, when the regeneration completion flag F_REOK is set to 0, the answer to the question of the step 2 becomes negative (NO), whereby a next filter regeneration operation is permitted. Thus, a filter regeneration operation can be prevented from being executed immediately after completion of regeneration of the filter 8, which makes it possible to evaporate fuel mixed into lubricating oil by the immediately preceding regeneration operation in accordance with travel of the vehicle V, to thereby reliably reduce oil dilution.

Further, the execution of the step 25 makes the answer to the question of the step 23 negative (NO), and in this case, the process proceeds to the step 26, wherein it is determined whether or not the regeneration execution flag F_REEX is equal to 1. If the answer to the question is negative (NO), the regeneration-inhibiting flag F_RESTP is set to 0 (step 27), followed by terminating the present process.

On the other hand, if the answer to the question of the step 26 is affirmative (YES), which means that the filter regeneration operation is permitted, it is determined whether or not the regeneration-inhibiting flag F_RESTP is equal to 1 (step 28). If the answer to the question is negative (NO), i.e. if the regeneration operation is currently being executed, the post injection amount QPOST is subtracted from the post injection allowable amount QREF (=QREF−QPOST), whereby the current value of the post injection allowable amount QREF is obtained (step 29). Then, it is determined whether or not the calculated post injection allowable amount QREF is not larger than a predetermined first threshold value QLMT1 (e.g.

0) (step 30). If the answer to the question is negative (NO), the present process is terminated, whereas if it is affirmative (YES), i.e. if QREF≦QLMT1 holds, the amount of fuel injected through the post injection has reached the post injection allowable amount QREF, and hence there is a fear that excessive oil dilution might occur. Therefore, it is judged that the regeneration operation is to be inhibited, and the regeneration-inhibiting flag F_RESTP is set to 1 (step 31), followed by terminating the present process. When the step 31 is executed, the answer to the question of the step 7 becomes affirmative (YES), whereby the post injection is inhibited to inhibit the filter regeneration operation.

Further, when the step 31 is executed, the answer to the question of the step 28 also becomes affirmative (YES), and in this case it is determined whether or not the post injection allowable amount QREF is not smaller than a predetermined second threshold value QLMT2 which is larger than the first threshold value QLMT1 (step 32). If the answer to the question is negative (NO), the present process is immediately terminated.

On the other hand, if the answer to the question of the step 32 is affirmative (YES), it is judged that oil dilution is sufficiently reduced by evaporation of fuel in accordance with travel of the vehicle V after inhibiting the regeneration operation, and the regeneration-inhibiting flag F_RESTP is set to 0 (step 33), followed by terminating the present process. Thus, the inhibition of the post injection is canceled.

Figure 5:
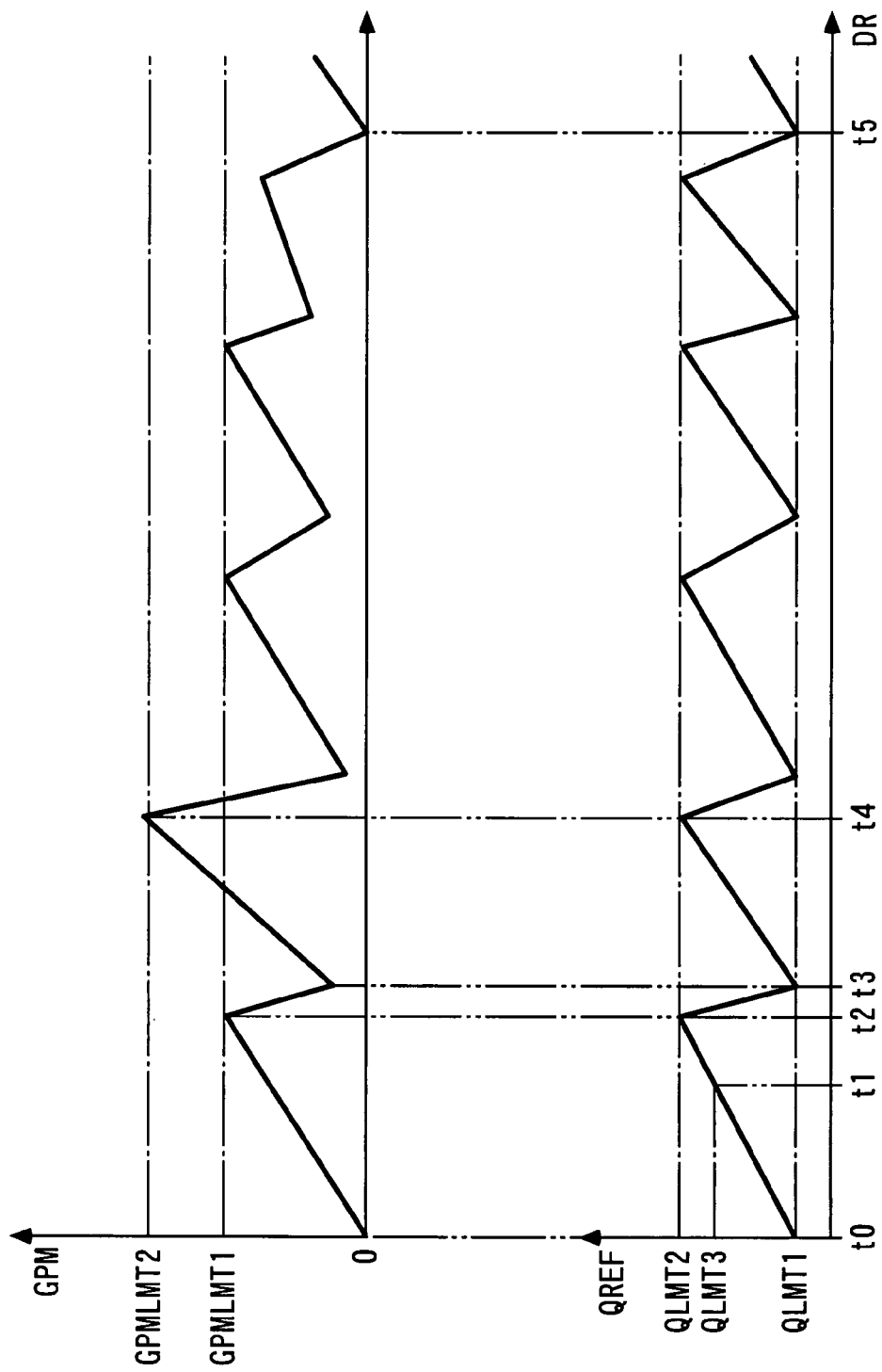
FIG. 5 is a timing diagram useful in explaining an example of operation achieved by the processes in FIGS. 2 and 3.

FIG. 5 is a timing diagram useful in explaining an example of the operation realized by the processes in FIGS. 2 and 3. Immediately after completion of regeneration of the filter 8, the PM deposition amount GPM and the post injection allowable amount QREF are both equal to 0 (time t0). As the travel distance of the vehicle V increases, the PM deposition amount GPM and the post injection allowable amount QREF also progressively increase. Then, when the post injection allowable amount QREF exceeds the third threshold value QLMT3 (t1), the answer to the question of the step 24 becomes affirmative (YES), and hence the regeneration completion flag F_REOK is set to 0. Further, when the PM deposition amount GPM exceeds the first threshold value GPMLMT1 (t2), the filter regeneration operation by the post injection is carried out. When the post injection is executed, PM deposited on the filter 8 is burned, whereby the PM deposition amount GPM is progressively reduced.

During execution of the regeneration operation, the post injection allowable amount QREF is progressively reduced by subtraction of the post injection amount QPOST from the post injection allowable amount QREF. Then, when the post injection allowable amount QREF becomes equal or smaller than the first threshold value QLMT1 (t3), the answer to the question of the step 30 becomes affirmative (YES), and hence the post injection is inhibited, whereby the filter regeneration operation is interrupted.

After inhibiting the post injection, the PM deposition amount GPM and the post injection allowable amount QREF progressively increase again in accordance with travel of the vehicle V. Then, when the post injection allowable amount QREF exceeds the second threshold value QLMT2 (t4), the answer to the question of the step 32 becomes affirmative (YES), and hence the inhibition of the post injection is canceled, whereby the regeneration operation is restarted. Thereafter, the same operations as described above are repeatedly carried out. Then, when the PM deposition amount GPM becomes equal to 0 (t5), i.e. when the answer to the question of the step 3 becomes affirmative (YES), it is judged that the regeneration of the filter 8 has been completed, and the regeneration operation is terminated. In this case, the post injection allowable amount QREF is reset to 0.

As described above, according to the present embodiment, the post injection allowable amount QREF is calculated by multiplying the TDC distance ΔDIST by the coefficient K1, and during execution of the post injection, the post injection amount QPOST is subtracted from the post injection allowable amount QREF, whereby the current value of the post injection allowable amount QREF is calculated. Therefore, by inhibiting the post injection when the post injection allowable amount QREF is not larger than the first threshold value QLMT1, it is possible not only to reliably suppress oil dilution so as to prevent occurrence of excessive oil dilution, but also to execute the post injection to the maximum possible extent.

Further, when the post injection allowable amount QREF exceeds the second threshold value QLMT2 after inhibiting the post injection, the inhibition of the post injection is canceled, so that the post injection can be restarted in appropriate timing in which oil dilution is reliably reduced.

Furthermore, when the PM deposition amount GPM becomes equal to 0, i.e. when regeneration of the filter 8 is completed, the post injection allowable amount QREF is reset to the minimum value of 0 on a safer side, and therefore it is possible to properly perform calculation of the post injection allowable amount QREF after completion of the filter regeneration and inhibition of the post injection and cancellation of the inhibition based on the calculated value of the post injection allowable amount QREF, while positively suppressing oil dilution.

In addition, since the post injection allowable amount QREF is used as a parameter for determining inhibition of the post injection and cancellation of the inhibition, it is possible to perform the determination with ease.

It should be noted that the present invention is not limited to the embodiment described above, but can be practiced in various forms. For example, although in the above-described embodiment, the first threshold value QLMT1 for use in determining whether or not to inhibit the post injection is set to 0, the value QLMT1 may be set to a larger value than 0. This makes it possible to execute the post injection in earlier timing. Further, although the degree of reduction of oil dilution according to the travel distance of the vehicle V is calculated by integrating the product of the TDC distance ΔDIST and the coefficient K1, this is not limitative, but it may be calculated by any other suitable method. Furthermore, although in the above-described embodiment, the engine is install on the vehicle by way of example, the present invention can be applied to a case where the engine is installed on other means of transportation than vehicles, such as airplanes.

Moreover, although in the above-described embodiment, the present invention is applied to the diesel engine by way of example, this is not limitative, but it can be applied to various types of engines, such as gasoline engines and engines for ship propulsion machines, such as an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:

1. An exhaust emission control system for an internal combustion engine, for reducing exhaust emissions by collecting particulates from exhaust gases discharged from the engine, which is installed on a means of transportation as a drive source, into an exhaust system, comprising:

a filter provided in the exhaust system, for collecting the particulates from the exhaust gases;

regeneration operation-executing means for carrying out post injection for additionally injecting fuel into a combustion chamber of the engine after a combustion stroke of the engine to thereby perform a regeneration operation for regenerating said filter;

travel distance-detecting means for detecting a travel distance of the means of transportation;

post injection allowable amount-calculating means for calculating a post injection allowable amount indicative of an allowable amount of fuel to be injected by the post injection such that the post injection allowable amount increases in accordance with an increase in the detected travel distance;

post injection allowable amount-reducing means for subtracting an amount of fuel injected by the post injection from the post injection allowable amount during execution of the post injection; and post injection-inhibiting means for inhibiting the post injection when the post injection allowable amount is not larger than a predetermined first threshold value.

2. An exhaust emission control system as claimed in claim 1, further comprising regeneration completion-determining means for determining whether or not regeneration of said filter by the regeneration operation has been completed, and post injection allowable amount-resetting means for resetting the post injection allowable amount when it is determined that the regeneration of said filter by the regeneration operation has been completed.

3. An exhaust emission control system as claimed in claim 1, further comprising post injection inhibition-canceling means for canceling the inhibition of the post injection when the post injection allowable amount becomes not smaller than a predetermined second threshold value larger than the first threshold value, during the inhibition of the post injection.

4. An exhaust emission control system as claimed in claim 3, further comprising regeneration completion-determining means for determining whether or not regeneration of said filter by the regeneration operation has been completed, and post injection allowable amount-resetting means for resetting the post injection allowable amount when it is determined that the regeneration of said filter by the regeneration operation has been completed.

5. A method of reducing exhaust emissions from an internal combustion engine by collecting particulates from exhaust gases discharged from the engine, which is installed on a means of transportation as a drive source, into an exhaust system provided with a filter for collecting the particulates from the exhaust gases, comprising:

a regeneration operation-executing step of carrying out post injection for additionally injecting fuel into a combustion chamber of the engine after a combustion stroke of the engine to thereby perform a regeneration operation for regenerating said filter;

a travel distance-detecting step of detecting a travel distance of the means of transportation;

a post injection allowable amount-calculating step of calculating a post injection allowable amount indicative of an allowable amount of fuel to be injected by the post injection such that the post injection allowable amount increases in accordance with an increase in the detected travel distance;

a post injection allowable amount-reducing step of subtracting an amount of fuel injected by the post injection from the post injection allowable amount during execution of the post injection; and a post injection-inhibiting step of inhibiting the post injection when the post injection allowable amount is not larger than a predetermined first threshold value.

6. A method as claimed in claim 5, further comprising a regeneration completion-determining step of determining whether or not regeneration of said filter by the regeneration operation has been completed, and a post injection allowable amount-resetting step of resetting the post injection allowable amount when it is determined that the regeneration of said filter by the regeneration operation has been completed.

7. A method as claimed in claim 5, further comprising a post injection inhibition-canceling step of canceling the inhibition of the post injection when the post injection allowable amount becomes not smaller than a predetermined second threshold value larger than the first threshold value, during the inhibition of the post injection.

8. A method as claimed in claim 7, further comprising a regeneration completion-determining step of determining whether or not regeneration of said filter by the regeneration operation has been completed, and a post injection allowable amount-resetting step of resetting the post injection allowable amount when it is determined that the regeneration of said filter by the regeneration operation has been completed.

9. An engine control unit including a control program for causing a computer to execute a method of reducing exhaust emissions from an internal combustion engine by collecting particulates from exhaust gases discharged from the engine, which is installed on a means of transportation as a drive source, into an exhaust system provided with a filter for collecting the particulates from the exhaust gases, wherein the control program causes the computer to carry out post injection for additionally injecting fuel into a combustion chamber of the engine after a combustion stroke of the engine to thereby perform a regeneration operation for regenerating said filter, detect a travel distance of the means of transportation, calculate a post injection allowable amount indicative of an allowable amount of fuel to be injected by the post injection such that the post injection allowable amount increases in accordance with an increase in the detected travel distance, subtract an amount of fuel injected by the post injection from the post injection allowable amount during execution of the post injection, and inhibit the post injection when the post injection allowable amount is not larger than a predetermined first threshold value.

10. An engine control unit as claimed in claim 9, wherein the control program causes the computer to determine whether or not regeneration of said filter by the regeneration operation has been completed, and reset the post injection allowable amount when it is determined that the regeneration of said filter by the regeneration operation has been completed.

11. An engine control unit as claimed in claim 9, wherein the control program causes the computer to cancel the inhibition of the post injection when the post injection allowable amount becomes not smaller than a predetermined second threshold value larger than the first threshold value, during the inhibition of the post injection.

12. An engine control unit as claimed in claim 11, wherein the control program causes the computer to determine whether or not regeneration of said filter by the regeneration operation has been completed, and reset the post injection allowable amount when it is determined that the regeneration of said filter by the regeneration operation has been completed.

* * * * *